(12) United States Patent
Joung et al.

(10) Patent No.: US 7,783,309 B2
(45) Date of Patent: Aug. 24, 2010

(54) WIRELESS COMMUNICATION SYSTEM AND CHANNEL CHANGING METHOD THEREOF

(75) Inventors: Chul-Yong Joung, Yongin-si (KR);
Yu-Young Cha, Yongin-si (KR);
Young-Ho Shin, Yongin-si (KR);
Bang-Won Lee, Yongin-si (KR)

(73) Assignee: Atlab Inc. (KR)

( * ) Notice: Subject to any disclaimer, the term of this patent is extended or adjusted under 35 U.S.C. 154(b) by 1043 days.

(21) Appl. No.: 11/180,742

(22) Filed: Jul. 13, 2005

(65) Prior Publication Data

US 2006/0019670 A1    Jan. 26, 2006

(30) Foreign Application Priority Data

Jul. 22, 2004    (KR) .................... 10-2004-0057388

(51) Int. Cl.
*H04W 72/00*    (2009.01)
*G06F 13/00*    (2006.01)
*H04B 7/00*    (2006.01)
*H04B 1/00*    (2006.01)

(52) U.S. Cl. ................ 455/464; 455/509; 455/63.1; 710/100

(58) Field of Classification Search .............. 455/452.1, 455/452.2, 464, 502, 509, 63.1, 63.3, 67.11, 455/67.13, 515, 517; 710/100
See application file for complete search history.

(56) References Cited

U.S. PATENT DOCUMENTS 7,028,114 B1 * 4/2006 Milan et al. ................. 710/100
7,130,635 B2 * 10/2006 Cerwall et al. .............. 455/450
7,304,970 B1 * 12/2007 Ishikawa .................... 370/335

(Continued)

FOREIGN PATENT DOCUMENTS

EP    1061762 A1    12/2000

(Continued)

OTHER PUBLICATIONS

English Translation of Chinese Office Action issued Dec. 12, 2008 corresponding to Chinese Application No. 2005100841385.

(Continued)

*Primary Examiner*—Un C Cho
(74) *Attorney, Agent, or Firm*—Cantor Colburn LLP

(57) ABSTRACT

A wireless communication system and a channel changing method thereof are provided. The wireless communication system which includes a plurality of channels, uses one of the plurality of channels as a specific channel, and uses another channel of the plurality of channels as a communication channel, includes: a base terminal for obtaining the one of the plurality of channels as an alternative channel, generating a channel change command including information on the alternative channel, and transmitting the command on a specific channel, when there is a data error received on the communication channel; and a wireless input device for resetting the alternative channel as a new communication channel and performing wireless communication on the communication channel which was reset, after obtaining the information on the alternative channel by receiving the channel change command from the specific channel. Accordingly, the base terminal can obtain the alternative channel by quickly sensing the channel cross talk so that a channel change can be performed immediately and actively, thereby enhancing the reliability and efficiency of the wireless communication.

30 Claims, 9 Drawing Sheets

U.S. PATENT DOCUMENTS

2002/0114295 A1\* 8/2002 Takahiro et al. ............. 370/329

FOREIGN PATENT DOCUMENTS

TW 550912 9/2003

OTHER PUBLICATIONS

Chinese Office Action issued Dec. 12, 2008 corresponding to Chinese Application No. 2005100841385.
Taiwan Office Action dated Apr. 23, 2009 corresponding to Taiwan Application No. 94123494.
English Translation of Taiwan Office Action dated Apr. 23, 2009 corresponding to Taiwan Application No. 94123494.

\* cited by examiner

RELATED ART

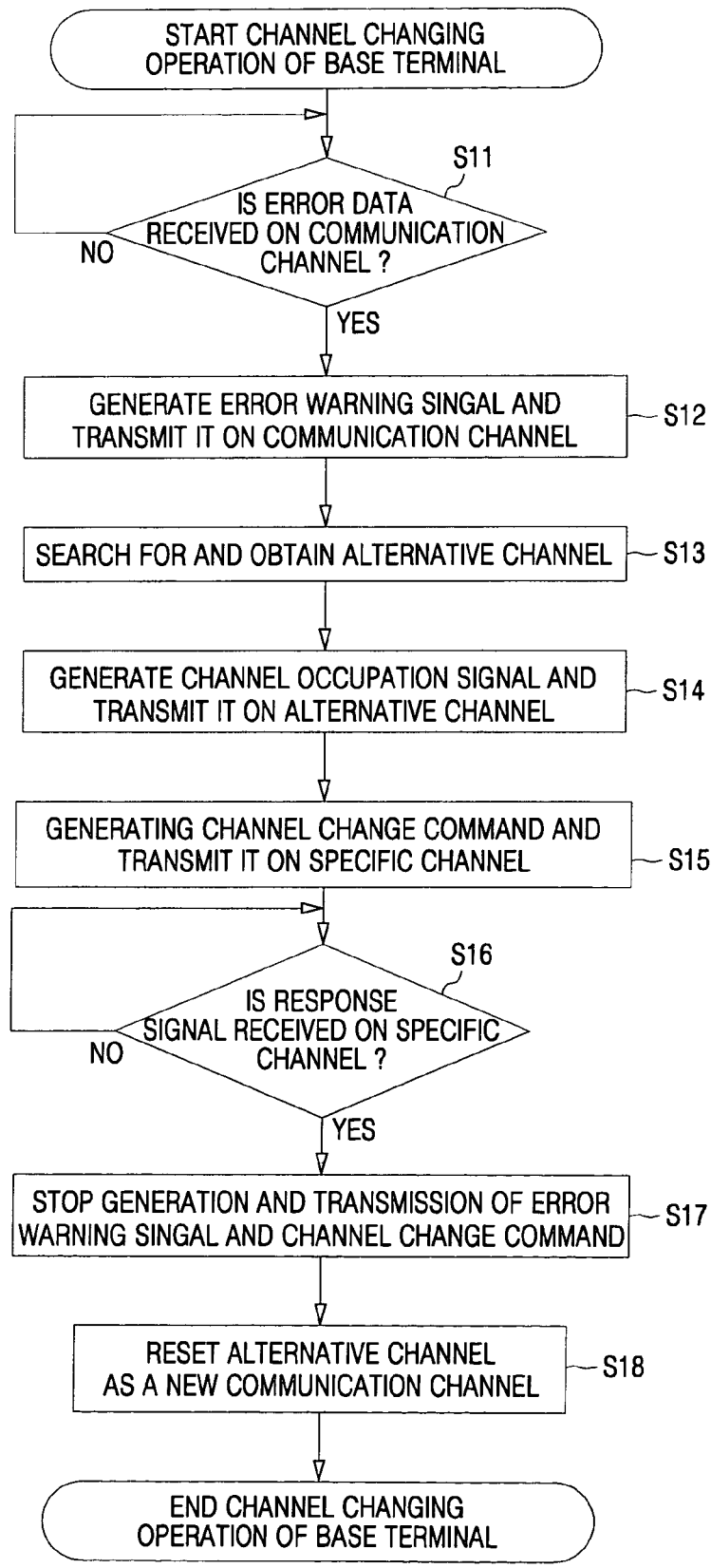

WIRELESS COMMUNICATION SYSTEM AND CHANNEL CHANGING METHOD THEREOF

CROSS-REFERENCE TO RELATED APPLICATION

This application claims the benefit of Korean Patent Application No. 2004-57388, filed Jul. 22, 2004, the contents of which are hereby incorporated herein by reference in their entirety.

BACKGROUND OF THE INVENTION

1. Field of the Invention

The present invention relates to a wireless communication system and, more particularly, to a wireless communication system and a channel changing method capable of changing an available channel to a channel having no cross talk when there occurs channel cross talk in a wireless communication system.

2. Description of Related Art

Recently, personal computers are widely being used, so almost everyone uses the computer. Such a computer has a human interface device (HID) connected thereto, and receives data transmitted from the HID and performs an operation corresponding to the data.

The human interface device generally refers to all devices which are used to process an interface between a human and a computer or peripheral equipment, which includes a keyboard, a mouse, a wireless sensor, a mobile phone, a notebook, a digital camera, and the like.

Such a human interface device gradually employs wireless communication technology in order to maximize user convenience.

The main system such as a computer further includes a separate device (a base terminal) performing wireless communication with the human input device so that it performs not only the wireless communication with the human input device but also various kinds of tasks using data provided from the human interface device.

Hereinafter, for the convenience of description, the human interface device performing the wireless communication with the base terminal is referred to as a wireless input device, and a wireless optical mouse is employed as an example of the wireless input device.

FIG. 1 is an internal block diagram of a wireless communication system. Referring to FIG. 1, the wireless communication system includes: a wireless input device 10 for setting a channel used to perform wireless communication with a base terminal 20 and performing the wireless communication on the channel; the base terminal 20 for assigning a channel corresponding to the wireless input device 10 and performing the wireless communication with the wireless input device 10 on the channel, and providing data of the wireless input device 10 obtained from the wireless communication to a main system 30; and the main system 30 for performing a variety of tasks in response to the data provided from the base terminal 20.

The wireless data generated from the wireless input device 10 for the wireless communication includes a unique ID of the wireless input device 10 and an error check code such that the base terminal 20 can identify the wireless input device 10 that has transmitted the wireless data. Further, the base terminal 20 can recognize whether or not the received wireless data is erroneous using the unique ID and the error check code.

However, the conventional base terminal 20 and wireless input device 10 employ an one-way communication scheme, wherein the base terminal 20 analyzes the wireless data received from the wireless input device 10 and determines whether or not the data was erroneous using the unique ID and the error check code.

At this time, most of cases where the wireless data received from the wireless input device 10 is erroneous are due to cross talk in current using channel. Further, although the error generated due to the channel cross talk in the base terminal 20 was sensed, there was no way how to inform the wireless input device 10 of the error occurrence.

Accordingly, when the user senses the error generated due to the channel cross talk, there is an inconvenience that he or she has to set manually a new channel between the wireless input device 10 and the base terminal 20 in manual. Further, there is a problem that efficiency and reliability of the wireless communication abruptly reduce since it is not possible to overcome the error generation promptly.

When setting the available channel again, the wireless input device 10 should scan a plurality of whole channels and should obtain an available channel out of the scanned channels since there is no information on the available channel. So, there were drawbacks that considerable time is unnecessarily wasted and accordingly it takes much time to change the channel.

Further, in the conventional wireless input device 10, its own channel cannot be prevented from another wireless device using the same channel band as the channel currently assigned to the wireless input device, so that the wireless input device 10 may be deprived of the channel when it does not use the channel for a predetermined time such as a power saving mode.

Furthermore, the conventional base terminal 20 has a problem in that it takes a long time to sense the channel cross talk since it depends on only the unique ID and the error detection code to determine whether or not the channel cross talk occurs.

SUMMARY OF THE INVENTION

Therefore, to solve the problem described hereinabove, the present invention provides a wireless communication system and a channel changing method capable of increasing reliability of wireless communication by actively changing the channel in a wireless input device when cross talk occurs on a channel between a base terminal and the wireless input device.

The present invention also provides a wireless communication system and a channel changing method capable of reducing a channel changing time by providing a wireless input device with available channel information when a base terminal senses cross talk on a channel currently assigned to the wireless input device.

The present invention also provides a wireless communication system and a channel changing method capable of increasing reliability of wireless communication between a base terminal and a wireless input device by enabling the base terminal to protect a channel assigned to the wireless input device.

The present invention also provides a wireless communication system and a channel changing method enabling a base terminal to quickly determine whether or not channel cross talk occurs.

A wireless communication system which includes a plurality of channels, uses one of the plurality of channels as a specific channel for control purpose, and uses another channel of the plurality of channels as an available channel for data communication purpose in accordance with a first aspect of the present invention, includes: a base terminal for obtaining the one of the plurality of channels as an alternative channel, generating a channel change command including information on the alternative channel, and transmitting the command on a specific channel, when there is a data error received on the communication channel; and a wireless input device for resetting the alternative channel as a new communication channel and performing wireless communication on the communication channel which was reset, after obtaining the information on the alternative channel by receiving the channel change command from the specific channel.

A wireless communication system which includes a plurality of channels, and uses one of the plurality of channels as an communication channel in accordance with a second aspect of the present invention, includes: a base terminal for obtaining the one of the plurality of channels as an alternative channel, and generating a channel change command including information on the alternative channel and transmitting the command on the alternative channel, when the data received on the communication channel has an error; and a wireless input device for obtaining a channel on which the channel change command is received by sequentially scanning the plurality of channels, resetting the channel on which the channel change command is received as a new communication channel, and performing wireless communication on the reset communication channel, when the data received on the communication channel has an error.

A channel changing method in a wireless communication system which includes a plurality of channels, uses one of the plurality of channels as a specific channel, and uses another channel of the plurality of channels as an communication channel, the wireless communication system including a base terminal and a wireless input device in accordance with a first aspect of the present invention, includes: a base terminal channel changing step of newly obtaining an alternative channel simultaneously with informing error occurrence on a communication channel, and generating a channel change command having information on the alternative channel and transmitting the command on the specific channel, when the base terminal receives wireless data on which an error has been occurred from the communication channel; and a wireless input device channel changing step of obtaining information on the alternative channel by receiving the channel change command on the specific channel, and resetting the alternative channel as the communication channel, when informed that an error occurred from the available channel.

A channel changing method in a wireless communication system which includes a plurality of channels, a base terminal using one of the plurality of channels as a communication channel, and a wireless input device in accordance with a second aspect of the present invention, includes: a base terminal channel changing step of newly obtaining an alternative channel simultaneously with informing error occurrence on current communication channel, and generating a channel change command and transmitting the command on the specific channel, when the base terminal receives data on which an error has been occurred from the communication channel; and a wireless input device channel changing step of obtaining a channel on which the channel change command is received by scanning the plurality of channels, and resetting the channel on which the channel change command is received as the communication channel, when informed that an error occurred from the available channel.

BRIEF DESCRIPTION OF THE DRAWINGS

The foregoing and other objects, features and advantages of the invention will be apparent from the more particular description of a preferred embodiment of the invention, as illustrated in the accompanying drawing. The drawing is not necessarily to scale, emphasis instead being placed upon illustrating the principles of the invention.

FIG. 5A is a flow chart illustrating a channel changing method of a base terminal using a channel as shown in FIG. 3;

DETAILED DESCRPTION OF THE INVENTION

Hereinafter, the detailed description of a preferred embodiment in accordance with the present invention will be apparent in connection with the accompanying drawings.

Figure 1:
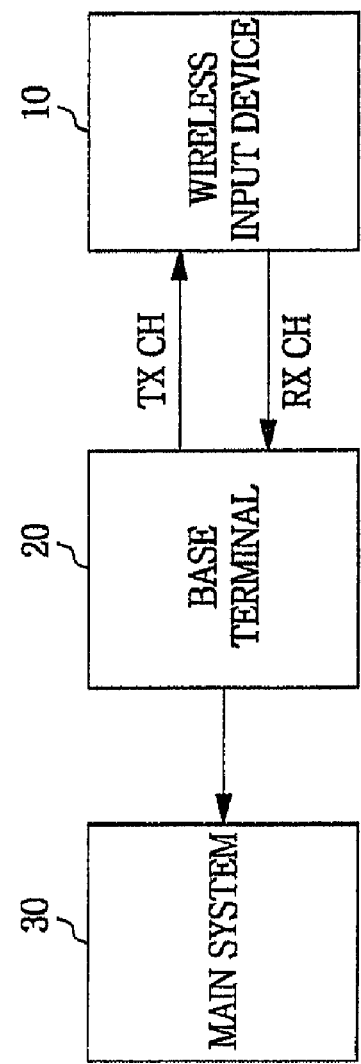
FIG. 1 is an internal block diagram of a conventional wireless communication system.
Figure 2:
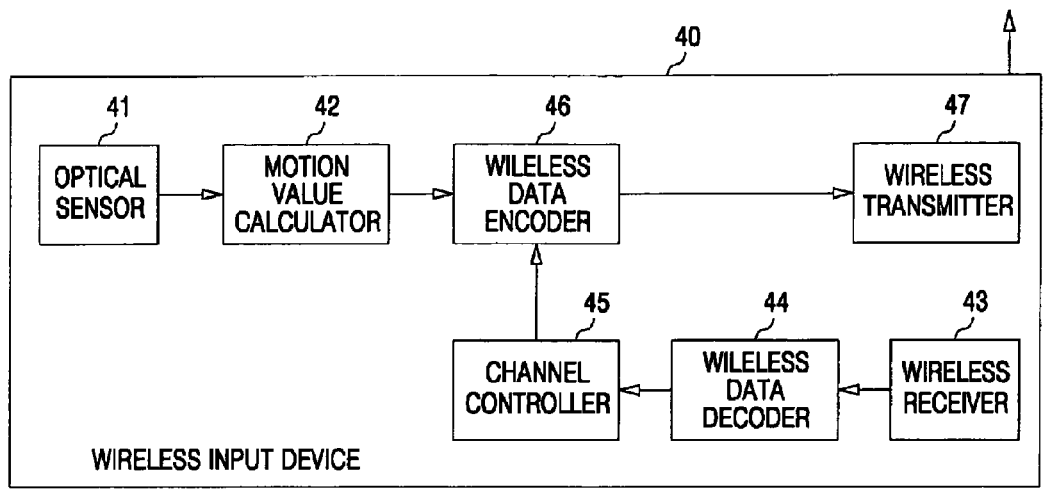
FIG. 2 is an internal block diagram of a wireless communication system in accordance with an embodiment of the present invention.
Figure 2:
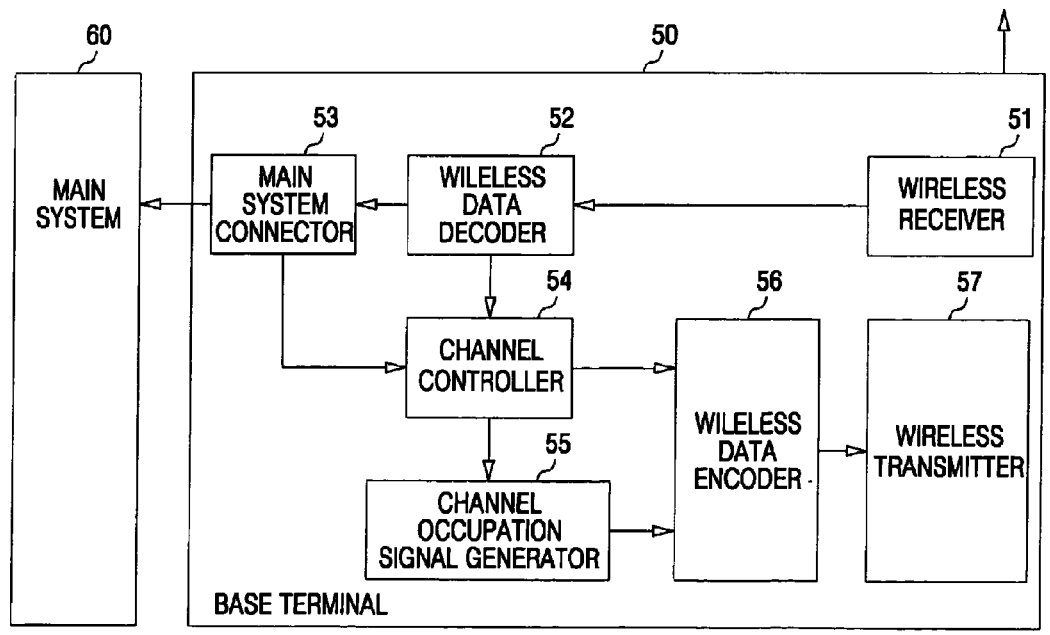

FIG. 2 is an internal block diagram of a wireless communication system in accordance with an embodiment of the present invention.

Referring to FIG. 2, the wireless communication system in accordance with the present invention includes a wireless input device 40 for generating and providing wireless data, a base terminal 50 for assigning a channel corresponding to the wireless input device 40, receiving data of the wireless input device 40 on the channel to provide a main system 60 with the data, and the main system 60 for performing various kinds of tasks in response to the data provided from the base terminal 50.

The wireless input device 40 includes an optical sensor 41, a motion value calculator 42, a wireless receiver 43, a wireless data decoder 44, a channel controller 45, a wireless data encoder 46, and a wireless transmitter 47. The base terminal 50 includes a wireless receiver 51, a wireless data decoder 52, a main system interface 53, a channel controller 54, a channel occupation signal generator 55, a wireless data encoder 56, and a wireless transmitter 57.

First, internal configuration elements of the wireless input device 40 will be described.

The optical sensor 41 of the wireless input device 40 samples an image of the bottom surface, and the motion calculator 42 compares images of the bottom surface and calculates motion values from the result of the comparison.

The wireless receiver 43 obtains and demodulates various data including an error signal, a channel change command, and a channel occupation signal of the base terminal 50, which are transmitted on the channel used by the wireless receiver 43.

The wireless data decoder 44 decodes data of the wireless receiver 43. Further, when the decoded signal is an error warning signal, the wireless data decoder 44 notifies the channel controller 45 of the error occurrence.

At this time, the wireless data decoder 44 determines that the channel is abnormal and notifies the channel controller 45 of the error occurrence when the following cases occur m times successively, that is, the case where data having a different unique ID is received, the case where an error check code included in the data is different from an expected value, the case where a specific code indicating the beginning or end cannot be found, and the case where data length is different from a predetermined value.

When informed that an error occurred from the wireless data decoder 44, the channel controller 45 is provided with a channel change command and a channel occupation signal from the wireless data decoder 44 and thus performs a channel changing operation.

The channel changing operation can be performed in two types according to a channel configuration method of the wireless system in accordance with the present invention, which will be described in more detail as follows.

The wireless data encoder 46 includes a unique ID of the wireless input device 40, an error check code, and specific code information indicating the beginning and end of the data. Further, when receiving a motion value from the motion value calculator 42, the wireless data encoder 46 generates transmission data by giving the unique ID of the wireless input device 40, the error check code for checking whether the data has an error, and the specific code indicating the beginning and end of the data to be transmitted to the received motion value, and transmits the transmission data to the wireless transmitter 47.

When the wireless transmitter 47 receives the transmission data from the wireless data encoder 46, modifies the transmission data, and wirelessly transmits the data.

Next, internal configuration elements of the base terminal 50 will be described.

The wireless receiver 51 obtains data transmitted on a communication channel assigned to the wireless input device 40 and demodulates the obtained data.

The wireless data decoder 52 decodes the demodulated data, senses an error of data by operating in the same manner as the wireless data decoder 44 of the wireless input device 40, notifies the channel controller 54 of the error occurrence. Otherwise, the wireless data decoder 51 transmits the demodulated data to the main system interface 53.

When the channel controller 54 is notified that an error occurred in the data received from the wireless data decoder 52, it performs a channel changing operation and generates and transmits an error warning signal and a channel change command to the corresponding wireless input device. Further, the channel controller 54 controls the channel occupation signal generator 55 and generates a channel occupation signal.

At this time, the error warning signal may be a signal including a false error check code such that the wireless data decoder 44 of the corresponding wireless input device 40 can sense the error occurrence. Further, the channel change command includes a unique ID of the corresponding wireless input device 40 and information on a channel to be used as a new communication channel.

The channel changing operation can be performed in two types in accordance with the channel configuration method of the wireless system of the present invention, which will be described in more detail below.

The channel occupation signal generator 55 periodically generates a channel occupation signal under the control of the channel controller 54 and transmits the signal to the corresponding wireless input device 40.

According to the present invention, the communication channel of the wireless input device 40 can be protected from another wireless input device 40 or other wireless devices even when the wireless input device 40 operates in a power saving mode.

The wireless data encoder 56 encodes a command and a signal transmitted from the channel controller 54 or the channel occupation signal generator 56.

The wireless transmitter 57 modulates the command and encoded signal from the wireless data encoder 56 and wirelessly transmits them.

The channel of the wireless communication system of the present invention can be configured in various methods as described above, which is generally divided into a channel configuration method that includes a specific channel and a channel configuration method that does not include the specific channel.

Figure 3:
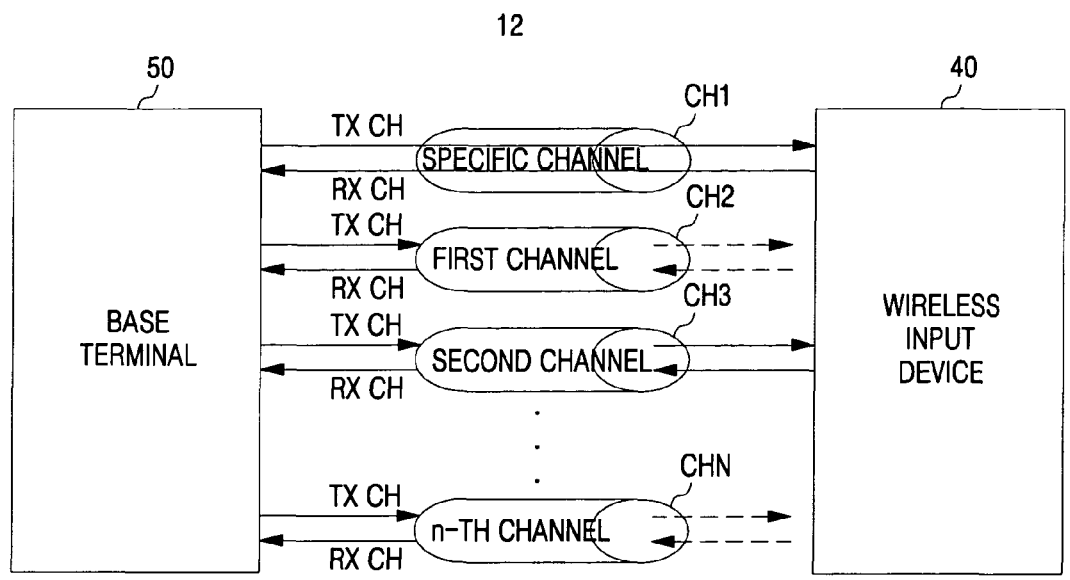
FIG. 3 is a conceptual diagram in accordance with one embodiment of the wireless communication system shown in FIG. 2.
Figure 4:
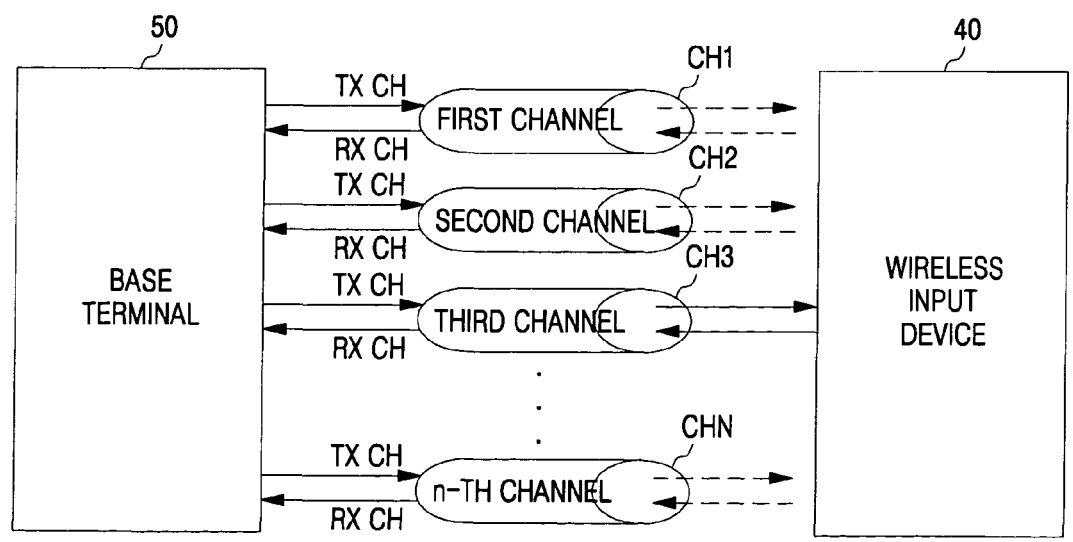
FIG. 4 is a conceptual diagram in accordance with another embodiment of the wireless communication system shown FIG. 2.

FIG. 3 is a diagram illustrating a channel configuration including a specific channel in accordance with one embodiment of the present invention, and FIG. 4 is a diagram illustrating a channel configuration where a specific channel is not included in accordance with another embodiment of the present invention.

First, the channel configuration including the specific channel will be described with reference to FIG. 3.

Referring to FIG. 3, a plurality of channels is used to perform wireless communication between the base terminal 50 and the wireless input device 40. One channel CH1 among the plurality of channels CH1-CHN is used as a specific channel, and one channel among remaining channels CH2-CHN is used as a communication channel CH3.

At this time, the specific channel CH1 is a fixed channel, which is always set between the base terminal 50 and the wireless input device 40 so as to be used in an emergency.

Of course, it is evident that the specific channel CH1 and the communication channel CH3 can be changed at need.

Among the plurality of channels CH1-CHN, only one channel CH3 is set as a communication channel so as to perform the wireless communication at the optimum environment between the base terminal 50 and the wireless input device 40, and the wireless communication between the base terminal 50 and the wireless input device 40 is performed on only the assigned channel CH3.

At this time, each of the channels CH1-CHN includes one transmission channel TX CH and one reception channel RX CH.

Here, the transmission channel TX CH of the specific channel is used to transmit a channel change command that is generated in the base terminal 50 that sensed the cross talk of the corresponding channel and transmitted, and the reception channel RX CH is used to transmit a response signal that is generated in the wireless input device 40 and transmitted in response to the channel change command.

The transmission channel TX CH of the communication channel is used to transmit an error warning signal generated in the base terminal that sensed the cross talk of the corresponding channel and transmitted, and a channel occupation signal generated from the base terminal 50 that sensed in which the wireless input device 40 operates in a power saving mode and transmitted. The reception channel RX CH of the communication channel is used to receive wireless data of the wireless input device 40.

Subsequently, the channel configuration that does not include a specific channel is described with reference to FIG. 4.

Referring to FIG. 4, each of the base terminal and the wireless input device that constitute the wireless communication system as shown in FIG. 2 includes a plurality of channels CH1-CHN, and uses one of the plurality of channels CH1-CHN which has the optimum wireless communication environment as an communication channel CH3.

Accordingly, a transmission channel TX CH of each channel is used to transmit an error warning signal, a channel change command, and a channel occupation signal generated in the base terminal 50 corresponding to the wireless input device 40 and transmitted, and the reception channel RX CH is used to receive a response signal generated in the wireless input device 40 in response to the channel change command and transmitted and wireless data generated by an operation of the wireless input device 40.

At this time, in the cases of FIGS. 3 and 4, although one channel is composed of two frequencies employing a frequency division scheme and each frequency is assigned with a reception frequency RX CH and a transmission channel TX CH, one channel can be used for transmission or reception according to a period of time by employing a time divisional scheme at need while it uses one frequency only.

Hereinafter, a description will be given to a channel changing method of the wireless communication system.

Figure 5B:
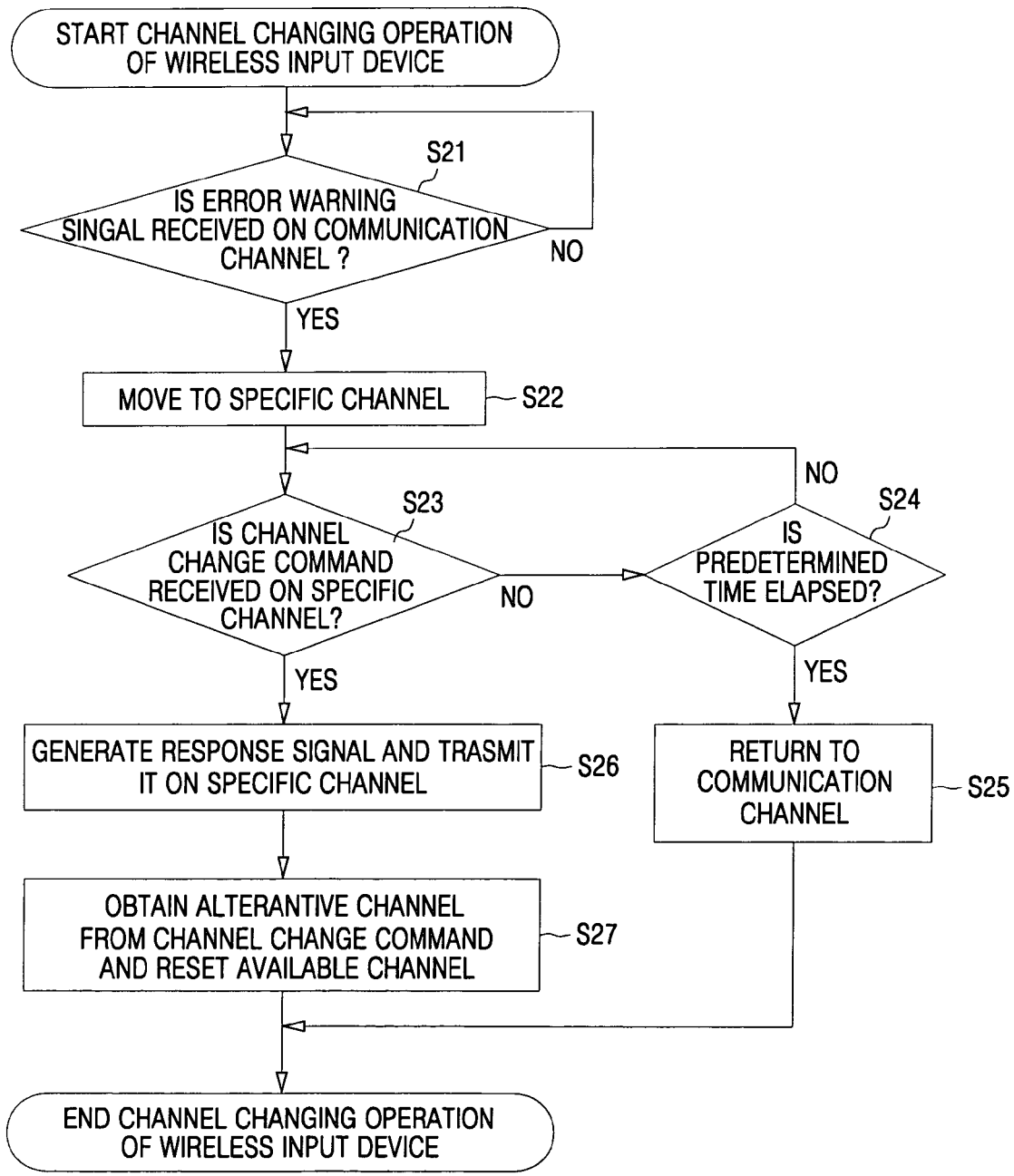
FIG. 5B is a flow chart illustrating a channel changing method of the wireless input device using the channel as shown in FIG. 3.

FIGS. 5A and 5B are diagrams illustrating a channel changing method of the wireless communication system having the channel configuration shown in FIG. 3.

FIG. 5A is a flow chart illustrating a channel changing method of a base terminal 50, and FIG. 5B is a flow chart illustrating a channel changing method of a wireless input device 40. Here, the channel change is performed through the wireless communication between the base terminal 50 and the wireless input device 40.

At this time, among the plurality of channels CH1-CHN used to make wireless communication between the wireless input device 40 and the base terminal 50, it is assumed that a first channel is used as a specific channel, a third channel CH3 is used as a communication channel, and a fifth channel CH5 is not occupied by any other devices when wireless communication is made between the wireless input device 40 and the base terminal 50.

First, an operation of the channel controller 54 of the base terminal 50 will be described with reference to FIG. 5A.

When data received on the communication channel CH3 has an error (step S11), the base terminal 50 periodically generates an error warning signal in order to notify the wireless input device 40 of the error occurrence, and transmits the error warning signal on the communication channel CH3 (step S12).

By sequentially scanning the plurality of channels CH1-CHN, an alternative channel having the optimum wireless communication environment, that is, a channel CH5 that is not currently used is searched for and obtained (step S13).

Further, besides the process of step S13, the base terminal 50 can secure the alternative channel in advance in order to reduce time to search for the alternative channel.

When the wireless input device 40 operates in the power saving mode, the base terminal 50 continuously calculates and stores statistics of use of the channels CH1-CHN, and secures the channel CH5 whose frequency of use is the lowest as the alternative channel.

When the alternative channel CH5 was completely obtained, the base terminal 50 periodically generates a channel occupation signal and transmits it on the alternative channel CH5 in order that other wireless devices cannot use the newly obtained alternative channel CH5, so that the newly obtained alternative channel CH5 is in a busy state (step S14).

The base terminal 50 generates a channel change command including information on the newly obtained alternative channel CH5 and a unique ID of the wireless input device 40 to receive the channel information, and transmits the information on the specific channel CH1 (step S15).

The base terminal 50 that has transmitted the channel change command on the specific channel CH1 continuously monitors the specific channel CH1 and confirms whether a response signal for the channel change command is received (step S16). When the response signal is not received, the process is returned to step S15 to continuously monitor whether the response signal is received from the specific channel CH1.

Meanwhile, when the response signal is received on the specific channel CH1 as a result of the confirmation of step S16, an error warning signal transmission on the communication channel CH3 and a channel change command transmission on the specific channel CH1 are stopped (step S17).

The alternative channel CH5 is reset as anew communication channel of the wireless input device 40 (step S18), and the channel changing operation in the base terminal 50 is terminated.

Subsequently, an operation of the channel controller 45 in the wireless input device 40 corresponding to the base terminal 50 shown in FIG. 5A will be described with reference to FIG. 5B.

When the wireless input device 40 receives an error warning signal on the communication channel CH3 (step S21), it senses and obtains the channel change command transmitted from the base terminal 50 while continuously monitoring the specific channel CH1 (step S23).

When the channel change command is not received on the specific channel CH1, the wireless input device 40 continuously monitors for a predetermined period (step S24). When the channel change command is not received until the predetermined period elapses, the wireless input device 40 returns to the current communication channel CH3 (step S25) and the channel changing operation of the wireless input device 40 is terminated.

Meanwhile, when the channel change command is received on the specific channel CH1, in order to notify the base terminal 50 that the channel change command was successfully received on the specific channel CH1, the response signal is generated and transmitted on the specific channel CH1 (step S26).

The unique ID of the wireless input device 40 and information on the alternative channel CH5 are obtained by demodulating and decoding the received channel change command. Further, when it is confirmed that the channel change command having the same unique ID as that of the wireless input device 40 was received, the alternative channel CH5 is reset as anew communication channel (step S27), the channel changing operation of the wireless input device 40 is terminated.

Figure 6:
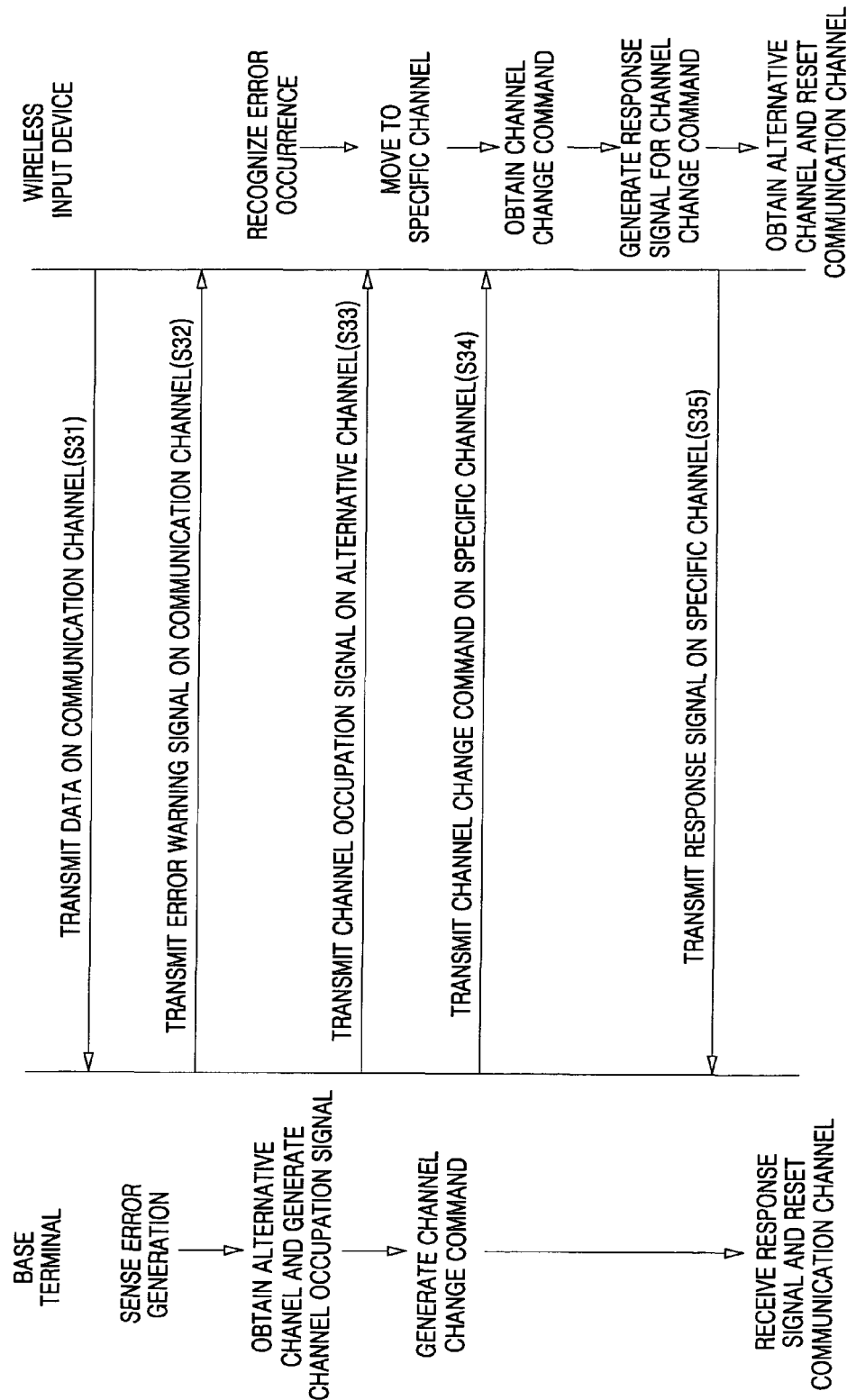
FIG. 6 is a diagram showing a flow of channel changing operations of the wireless communication system of FIGS. 5A and 5B.

FIG. 6 is a diagram showing a flow of channel changing operations of the wireless communication system of FIGS. 5A and 5B.

First, when data of the wireless input device 40 is transmitted to the base terminal 50 on the communication channel CH3 on which the cross talk has occurred (step S31), the base terminal 50 senses error occurrence using the received data, generates an error warning signal, and notifies the wireless input device 40 of the error occurrence on the communication channel CH3 (step S32).

Here, The wireless input device 40 recognizes the error occurrence, and moves to the specific channel CH1. The base terminal 50 notifying the error occurrence obtains the alternative channel CH5, generates a channel occupation signal to make the obtained alternative channel CH5 busy, and transmits it on the alternative channel CH5 (step S33).

The base terminal 50 generates a channel change command having information on the alternative channel CH5 used to newly start the wireless communication and transmits a channel-changing signal to the wireless input device 40 on the specific channel CH1 (step S34).

The wireless input device 40 receives the channel change command provided by the base terminal 50 on the specific channel CH1, generates the response signal in response to the command, and transmits the response signal on the specific channel CH1 (step S35). And then, the wireless input device 40 obtains the alternative channel CH5 from the channel change command and sets it as a communication channel.

Further, when the base terminal 50 receives the response signal of the wireless input device 40 on the specific channel CH1, it also sets the alternative channel CH5 as the communication channel.

Figure 7A:
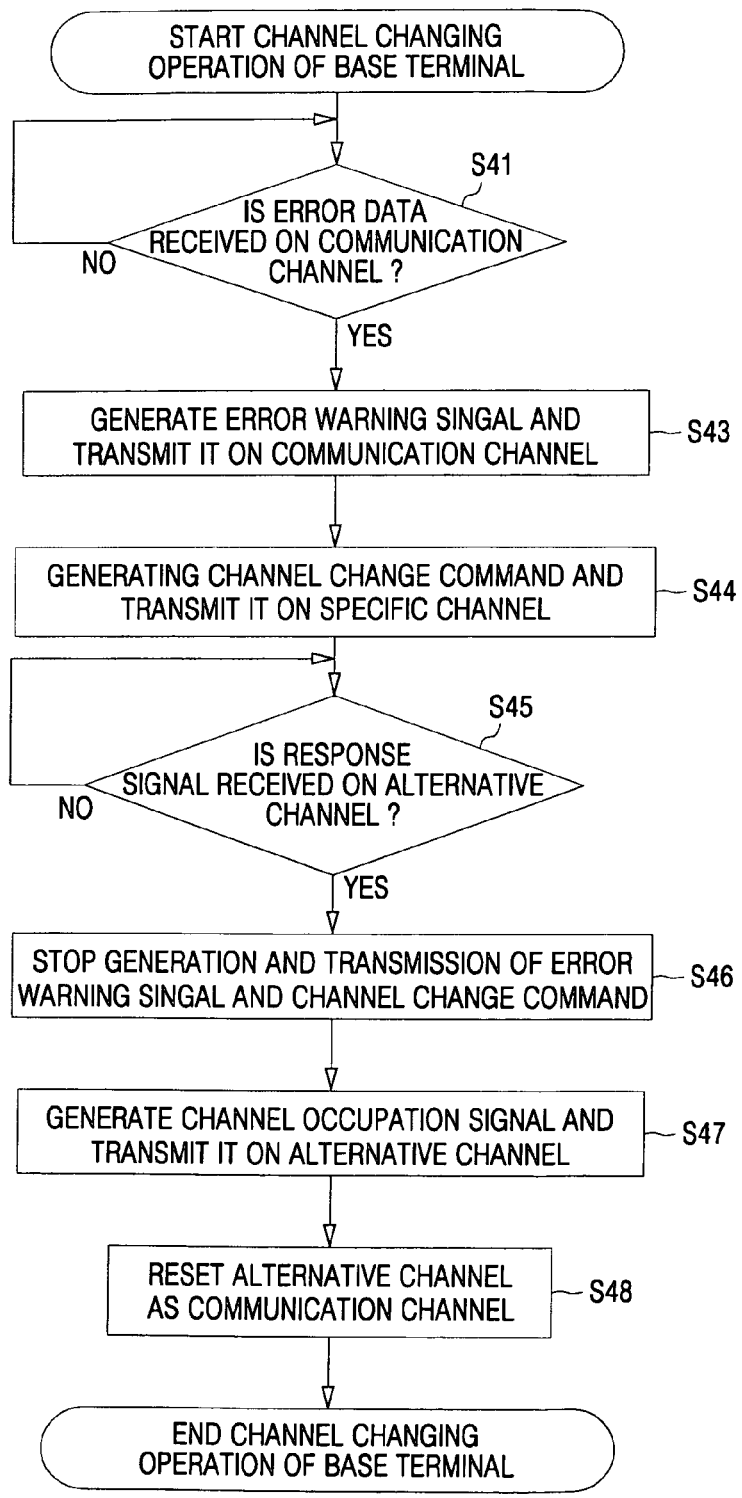
FIG. 7A is a flow chart illustrating a channel changing method of the base terminal using the channel of FIG. 4.
Figure 7B:
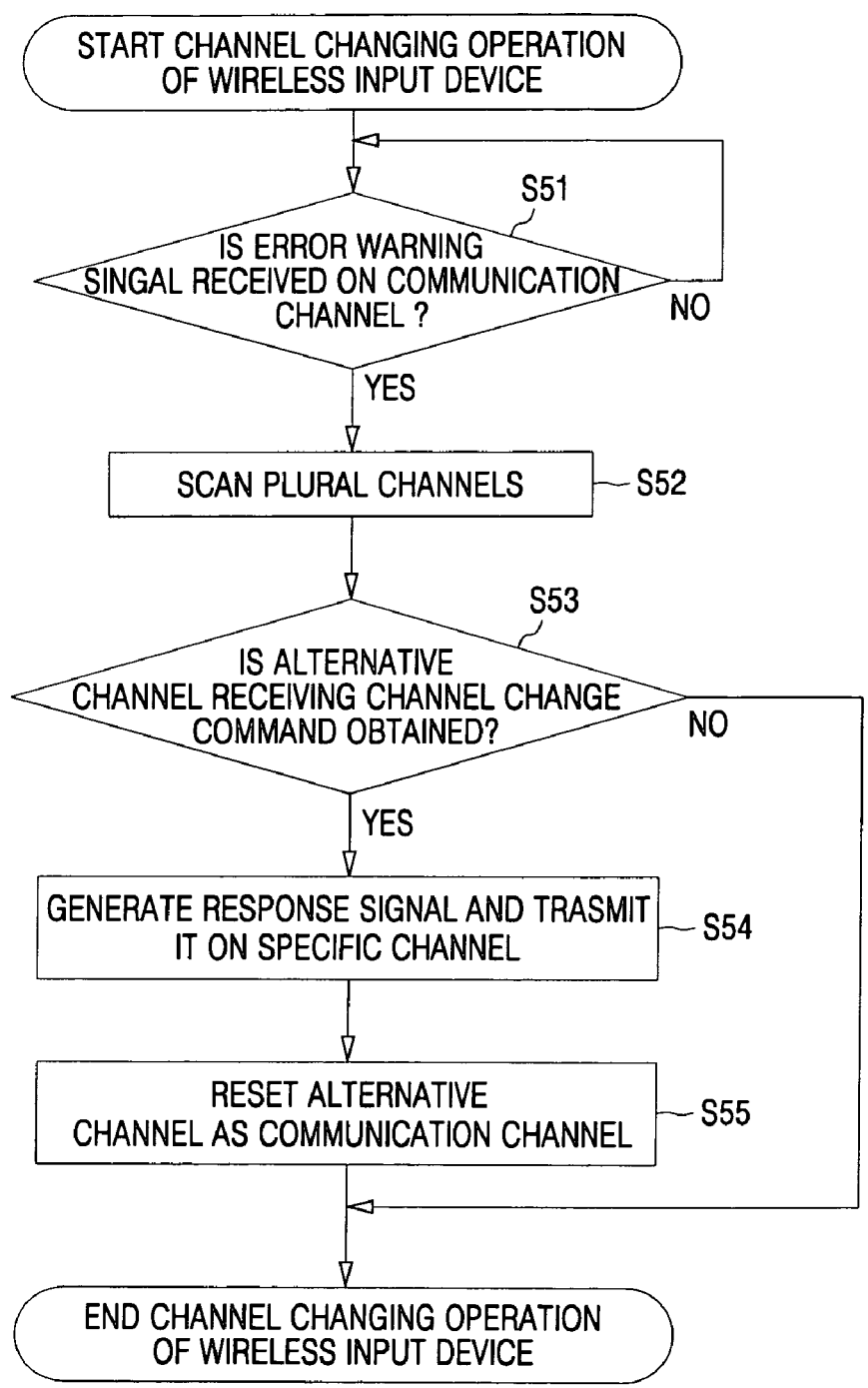
FIG. 7B is a flow chart illustrating a channel changing method of the wireless input device using the channel of FIG. 4.

FIGS. 7A and 7B are flow charts illustrating another channel changing method of the wireless communication system having the channel configuration shown in FIG. 4.

FIG. 7A is a flow chart illustrating a channel changing method of the base terminal, and FIG. 7B is a flow chart illustrating a channel changing method of the wireless input device. A channel change is performed through wireless communication between the base terminal 50 and the wireless input device 40.

At this time, among the plurality of channels CH1-CHN used to perform the wireless communication between the wireless input device 40 and the base terminal 50, it is assumed that in the wireless communication system, a third channel CH3 is used as a communication channel and a fifth channel CH5 is not occupied by any other device when wireless communication is made between the wireless input device 40 and the base terminal 50.

First, an operation of the channel controller 54 of the base terminal 50 will be described with reference to FIG. 7A.

When wireless data received on the communication channel CH3 has an error (step S41), the base terminal 50 periodically generates an error warning signal in order to notify the wireless input device 40 of the error occurrence, and transmits the error warning signal on the communication channel CH3 (step S42).

The base terminal 50 performs step S22 simultaneously with sequentially scanning the plurality of channels CH1-CHN, searches for the channel CH5 that is not currently used, and obtains the channel CH5 as an alternative channel (step S43).

In order to reduce the time to search for the alternative channel as shown in FIG. 5, the base terminal 50 can secure the alternative channel in advance. A description for that will be omitted.

The base terminal 50 generates a channel change command including information on the newly obtained alternative channel CH5 and a unique ID of the wireless input device 40 used to receive the alternative channel information, and transmits the command on the alternative channel CH5 (step S44).

The base terminal 50 that has transmitted the channel change command on the alternative channel CH5 continuously monitors the alternative channel CH5, and confirms whether a response signal for the channel change command is received (step S45). When the response signal is received on the alternative channel CH5, error warning signal transmission on the communication channel CH5 and channel change command transmission on the alternative channel CH5 are stopped (step S46).

In order that other wireless devices cannot use the newly obtained alternative channel CH5, the base terminal 50 periodically generates a channel occupation signal and transmits it on the alternative channel CH5, so that the newly obtained alternative channel CH5 is in a busy state (step S47). The base terminal 50 resets the alternative channel CH5 as a communication channel (step S48) and terminates the channel changing operation.

Subsequently, an operation of the channel controller 45 of the wireless input device 40 corresponding to the base terminal 50 shown in FIG. 7A will be described with reference to FIG. 7B.

When the wireless input device 40 receives the error warning signal on the communication channel CH3 (step S51), scanning is sequentially performed according to a scanning order set in the wireless input device 40 (step S52).

As a result of the scanning, when the channel CH5 on which the channel change command is received is obtained (step S53), a response signal is generated and transmitted on the alternative channel CH5 in order to notify the base terminal 50 that the channel change command was successfully received (step S54).

When the wireless input device 40 completes the response signal transmission on the alternative channel CH5, it resets the newly obtained alternative channel CH5 as a new communication channel (step S55), and terminates a channel changing operation of the wireless input device 40.

Figure 8:
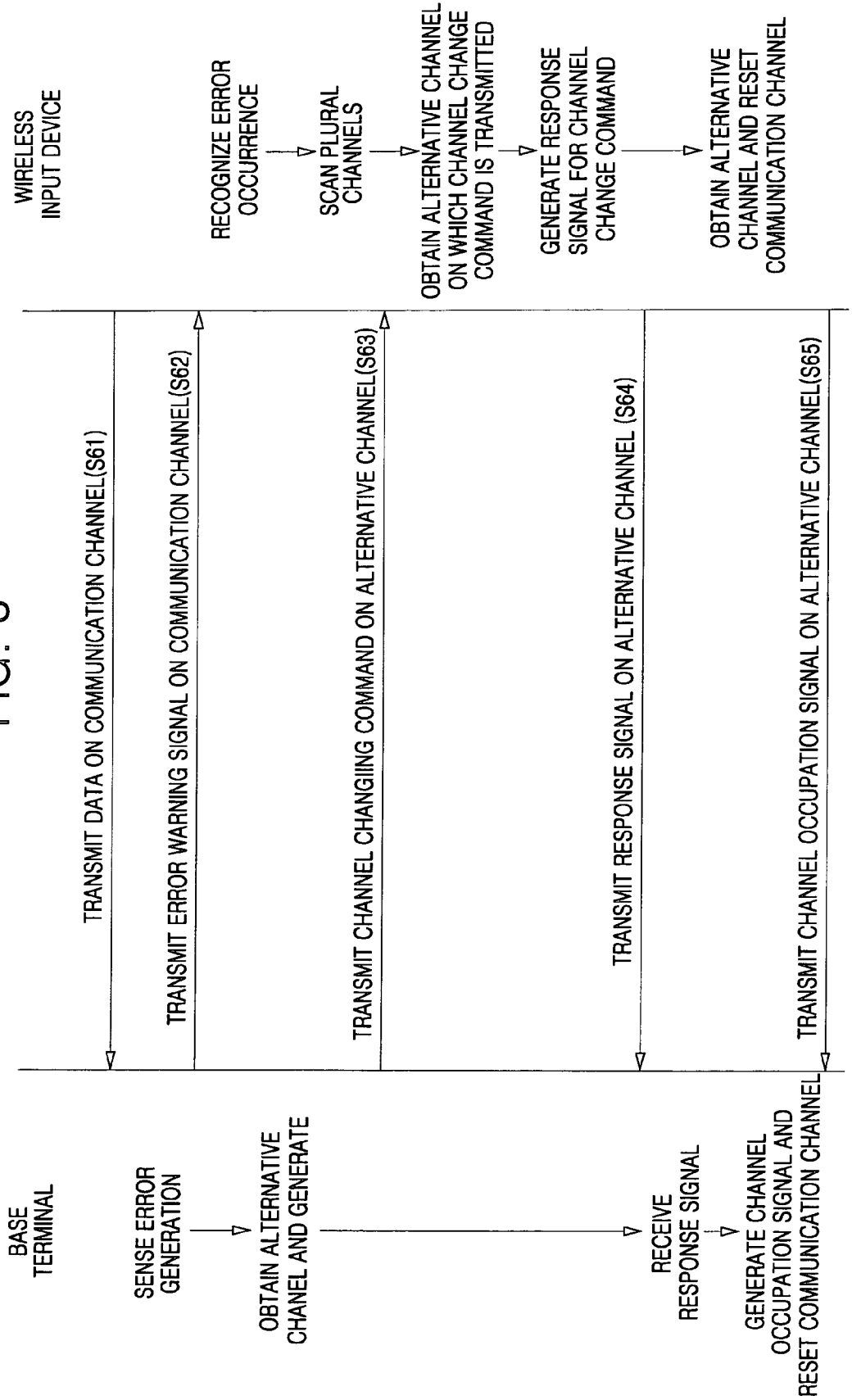
FIG. 8 is a diagram showing a flow of channel changing operations of the wireless input device shown in FIGS. 7A and 7B.

FIG. 8 is a diagram showing a flow of channel changing operations of the wireless input device shown in FIGS. 7A and 7B.

First, when data of the wireless input device 40 is transmitted to the base terminal 50 on the communication channel CH3 on which the cross talk occurred (step S61), the base terminal 50 senses the error occurrence from the received data, generates an error warning signal, and transmits the error warning signal on the communication channel CH3 (step S62).

The base terminal 50 obtains the alternative channel CH5, and generates a channel change command and transmits the channel change command on the alternative channel CH5 (step S63).

When the wireless input device 40 receives the error warning signal and recognizes the error occurrence, it sequentially scans the plurality of channels CH1-CHN and obtains the alternative channel CH5 on which the channel change command is received. And then, the wireless input device 40 generates a response signal, and transmits the response signal on the alternative channel CH5 (step S64). Further, the wireless input device 40 resets the alternative channel CH5 as a communication channel.

When the base terminal 50 also receives the response signal of the wireless input device 40 on the alternative channel CH5, it resets the alternative channel CH5 as the communication channel, generates a channel occupation signal to make the alternative channel CH5 busy, and transmits the signal on the alternative channel CH5 (step S65).

According to the wireless communication system and its channel changing method of the present invention, when the channel cross talk occurs between the base terminal and the wireless input device, the base terminal senses the channel cross talk and notifies the wireless input device of the channel cross talk. And then, the base terminal enables the wireless input device to abruptly perform the channel change. Accordingly, efficiency and reliability of the wireless communication are guaranteed.

Further, since the base terminal obtains the alternative channel and provides the wireless input device with information for the alternative channel, the time needed when the channel is changed is reduced.

Further, since the base terminal provides a function of protecting a channel between the base terminal and the wireless input device although the wireless input device operates in the power saving mode, reliability of the wireless communication is increased.

Further, since it is possible to confirm the channel cross talk between the base terminal and the wireless input device depending on more various determination references, a faster response is provided.

While this invention has been described in connection with what is presently considered to be the most practical and preferred embodiment, it is to be understood that the invention is not limited to the disclosed embodiment, but on the contrary, it is intended to cover various modification within the spirit and the scope of the Invention, which is set forth in the appended claims.

What is claimed is:

1. A wireless communication system which includes a plurality of channels, uses one of the plurality of channels as a specific channel, and uses another channel of the plurality of channels as a communication channel, the system comprising:
   a base terminal for obtaining the one of the plurality of channels as an alternative channel, generating a channel change command including information on the alternative channel, and transmitting the command on a specific channel, when there is a data error received on the communication channel; and
   a wireless mouse for resetting the alternative channel as a new communication channel and performing wireless communication on the communication channel which was reset, after obtaining the information on the alternative channel by receiving the channel change command from the specific channel,
   wherein the base terminal physically connects to a computer and interfaces data between the computer and the wireless mouse;
   wherein the base terminal comprises a first wireless communicator for converting a first wireless data into data that can be recognized by the base terminal and confirming whether there occurs an error on the first wireless data, when obtaining the first wireless data, and converting a data to transmit into a second wireless data and wirelessly transmitting the second wireless data, when generating the data to transmit to the wireless mouse;
   wherein the first wireless data comprises various kinds of data, a unique ID of the wireless mouse, an error check code, and a specific code indicating a beginning and an end of the first wireless data;
   wherein the first wireless communicator determines that there is an error in the first wireless data received on the communication channel, when the first wireless data having the unique ID that cannot be recognizable is received, the error check code included in the first wireless data is different from an expected value, the specific code cannot be found, or a size of the first wireless data is different from another expected value.

2. The system according to claim 1, wherein the base terminal further comprises:
   a first channel controller for obtaining an alternative channel having an optimum communication condition, and generating a channel change command including information on the alternative channel and transmitting the command on the specific channel, when informed that an error occurred from the first wireless communicator; and
   an interface for performing a physical connection to a main system and interfacing data between the main system and the base terminal.

3. The system according to claim 2, wherein the first channel controller obtains a channel that is not currently occupied by any other devices as the alternative channel by sequentially scanning the plurality of channels.

4. The system according to claim 2, wherein the first channel controller continuously monitors statistics of use of the plurality of channels and obtains a channel having a lowest frequency of use as the alternative channel.

5. The system according to claim 2, wherein the first channel controller further comprises functions of informing error occurrence on the communication channel when an error is sensed, generating a channel occupation signal periodically and transmitting the signal on the alternative channel when the alternative channel is obtained, and resetting the alternative channel as a new communication channel when the channel change command is normally transmitted.

6. The system according to claim 2, wherein the first channel controller further comprises a channel occupation signal generator for periodically generating the channel occupation signal when the alternative channel is obtained and transmitting the signal on the alternative channel.

7. The system according to claim 1, wherein the channel change command further comprises information on the unique ID of the wireless mouse.

8. The system according to claim 1, wherein each of the plurality of channels includes a transmission channel and a reception channel that use different frequencies from each other using a frequency division scheme.

9. The system according to claim 1, wherein the wireless mouse comprises:
   a second wireless communicator for converting the second wireless data into data that can be recognized by the wireless mouse and confirming whether there occurs an error on the second wireless data, when obtaining the second wireless data, and converting a data to transmit into the first wireless data and wirelessly transmitting the first wireless data, when generating the transmitted data to transmit to the base terminal;
   a second channel controller for receiving the channel change command from the specific channel, obtaining the information on the alternative channel and resetting the obtained alternative channel as a new communication channel, and performing the wireless communication on the reset communication channel, when informed that an error occurred from the second wireless communicator.

10. The system according to claim 9, wherein the second wireless communicator determines that there is an error in the second wireless data received on the communication channel, when the second wireless data having the unique ID that cannot be recognizable is received, an error check code included in the second wireless data is different from an expected value, the specific code cannot be found, or a size of the second wireless data is different from another expected value.

11. A wireless communication system which includes a plurality of channels, and uses one of the plurality of channels as a communication channel, the system comprising:
   a base terminal for obtaining the one of the plurality of channels as an alternative channel, and generating a channel change command including information on the alternative channel and transmitting the command on the alternative channel, when the data received on the communication channel has an error; and
   a wireless mouse for obtaining a channel on which the channel change command is received by sequentially scanning the plurality of channels, resetting the channel on which the channel change command is received as a new communication channel, and performing wireless communication on the reset communication channel, when the data received on the communication channel has an error,
   wherein the base terminal physically connects to a computer and interfaces data between the computer and the wireless mouse;
   wherein the base terminal comprises a first wireless communicator for converting a first wireless data into data that can be recognized by the base terminal and confirming whether there occurs an error on the first wireless data, when obtaining the first wireless data, and converting a data to transmit into a second wireless data and wirelessly transmitting the second wireless data when generating the data to transmit to the wireless mouse;
   wherein the first wireless data comprises data having various kinds of information, a unique ID of the wireless mouse, an error check code, and a specific code indicating a beginning and an end of the first wireless data;
   wherein the first wireless communicator determines that there is an error in the data received on the communication channel, when the first wireless data having the unique ID that cannot be recognizable is received, the error check code included in the first wireless data is different from an expected value, the specific code cannot be found, or a size of the first wireless data is different from another expected value.

12. The system according to claim 11, wherein the base terminal further comprises:
   a first channel controller for obtaining an alternative channel having an optimum communication condition, and generating a channel change command including information on the alternative channel and transmitting the command on the alternative channel, when informed that an error occurred from the first wireless communicator; and
   an interface for performing a physical connection to a main system and interfacing data between the main system and the base terminal.

13. The system according to claim 12, wherein the first channel controller obtains a channel that is not currently used as the alternative channel by sequentially scanning the plurality of channels.

14. The system according to claim 12, wherein the first channel controller continuously monitors statistics of use of the plurality of channels and obtaining a channel having the lowest frequency of use as the alternative channel.

15. The system according to claim 12, wherein the first channel controller further comprises functions of informing error occurrence on the communication channel when an error is sensed, generating a channel occupation signal periodically and transmitting the signal on the alternative channel when the alternative channel is obtained, and resetting the alternative channel as the communication channel when the channel change command is normally transmitted.

16. The system according to claim 12, wherein the first channel controller further comprises a channel occupation signal generator for periodically generating the channel occupation signal when the alternative channel is obtained and transmitting the signal on the alternative channel.

17. The system according to claim 11, wherein the channel change command further comprises information on the unique ID of the wireless mouse.

18. The system according to claim 11, wherein each of the plurality of channels includes a transmission channel and a reception channel that use different frequencies using a frequency division scheme.

19. The system according to claim 11, wherein the wireless mouse comprises:
   a second wireless communicator for converting the second wireless data into data that can be recognized by the wireless mouse and confirming whether there occurs an error on the second wireless data, when obtaining the second wireless data, and converting transmitted data into the first wireless data and wirelessly transmitting the first wireless data, when generating the transmitted data to transmit to the base terminal; and
   a second channel controller for obtaining the alternative channel on which the channel change command is received by sequentially scanning the plurality of channels, resetting the alternative channel as a new communication channel, and performing wireless communication on the reset communication channel, when informed that an error occurred from the second wireless communicator.

20. The system according to claim 19, wherein the second wireless communicator determines that there is an error in the data received on the communication channel, when the second wireless data having the unique ID that cannot be recognizable is received, an error check code included in the second wireless data is different from an expected value, a specific sign cannot be found, or a size of the second wireless data is different from another expected value.

21. A channel changing method in a wireless communication system which includes a plurality of channels, uses one of the plurality of channels as a specific channel, and uses another channel of the plurality of channels as a communication channel, the wireless communication system including a base terminal and a wireless mouse, the method comprising:
   a base terminal channel changing step of newly obtaining an alternative channel simultaneously with informing error occurrence on a communication channel, and generating a channel change command having information on the alternative channel and transmitting the command on the specific channel, when the base terminal receives wireless data on which an error has been occurred from the communication channel; and
   a wireless mouse channel changing step of obtaining information on the alternative channel by receiving the channel change command on the specific channel, and resetting the alternative channel as a new communication channel, when informed that an error occurred from the communication channel, wherein the base terminal physically connects to a computer and interfaces data between the computer and the wireless mouse, wherein the base terminal channel changing step comprises:

an error notifying step of notifying the communication channel of the error occurrence when there is an error in the data received from the communication channel;

a channel change requesting step of obtaining an alternative channel having an optimum communication environment by sequentially scanning the plurality of channels, and generating a channel change command having information on the alternative channel and transmitting the command on the specific channel;

an alternative channel protecting step of periodically generating a channel occupation signal and transmitting the signal on the alternative channel; and a communication channel resetting step of resetting the alternative channel as the communication channel when the channel change command is successfully transmitted.

22. The method according to claim 21, wherein the alternative channel corresponds to a channel that is not currently used among the plurality of channels.

23. The method according to claim 21, wherein the alternative channel corresponds to a channel that has the lowest frequency of use for a predetermined time.

24. The method according to claim 21, wherein the channel change command further comprises information on a unique ID of the wireless mouse.

25. The method according to claim 21, wherein the wireless mouse channel changing step comprises the steps of:

receiving the channel change command by monitoring the specific channel when informed that an error occurred from the communication channel; and obtaining information on the alternative channel by analyzing the channel change command, and resetting the alternative channel as the communication channel.

26. A channel changing method in a wireless communication system which includes a plurality of channels, uses one of the plurality of channels as a communication channel, the wireless communication system including a base terminal and a wireless mouse, the method comprising:

a base terminal channel changing step of newly obtaining an alternative channel simultaneously with informing error occurrence on a communication channel, and generating a channel change command and transmitting the command on the alternative channel, when the base terminal receives data on which an error has been occurred from the communication channel; and a wireless mouse channel changing step of obtaining a channel on which the channel change command is received by scanning the plurality of channels, and resetting the channel on which the channel change command is received as a new communication channel, when informed that an error occurred from the communication channel, wherein the base terminal physically connects to a computer and interfaces data between the computer and the wireless mouse, wherein the base terminal channel changing step includes:

an error notifying step of notifying the communication channel of the error occurrence, when there has been occurred an error in the data received from the communication channel;

a channel change requesting step of obtaining the alternative channel by sequentially scanning the plurality of channels, and generating the channel change command including information on the alternative channel and transmitting the command on the alternative channel;

a resetting step of resetting the alternative channel as a new communication channel when the channel change command is successfully transmitted; and an alternative channel protecting step of periodically generating a channel occupation signal and transmitting the signal on the alternative channel.

27. The method according to claim 26, wherein the alternative channel corresponds to a channel that is not currently used among the plurality of channels.

28. The method according to claim 26, wherein the alternative channel corresponds to a channel that has the lowest frequency of use for a predetermined time.

29. The method according to claim 26, wherein the channel change command includes information on a unique ID of the wireless mouse and the alternative channel.

30. The method according to claim 26, wherein the wireless mouse channel changing step includes the steps of:

obtaining a channel on which the channel change command is received by sequentially scanning the plurality of channels when informed that an error occurred from the communication channel; and resetting the channel on which the channel change command is received as a new communication channel.

* * * * *